United States Patent Office 3,514,497
Patented May 26, 1970

3,514,497
OLEFIN CONVERSION AND
CATALYST THEREFOR
William B. Hughes, Bartlesville, Okla., assignor to Phillips
Petroleum Company, a corporation of Delaware
No Drawing. Filed Dec. 11, 1967, Ser. No. 689,283
Int. Cl. C07c 13/16; B01j 11/82
U.S. Cl. 260—666
9 Claims

ABSTRACT OF THE DISCLOSURE

Olefin hydrocarbons are converted into other olefinic products by contact with a catalyst system comprising (1) a complex compound of rhodium and (2) a metal or organometal halide.

This invention relates to the conversion of olefin hydrocarbons and to a catalyst for effecting such conversion. In one aspect this invention relates to a process and a catalyst for converting 4-vinylcyclohexene to 3-ethylidenecyclohexene. In another aspect this invention relates to a method for preparing a catalyst from a complex rhodium compound such as tris(triphenylphosphine) chlororhodium and a metal halide or organometal halide such as ethylaluminum dichloride.

The conversion of olefins to other olefinic products is an operation which can be carried out advantageously in a number of situations. For example, a more plentiful olefin may be converted to a less plentiful and thereby more valuable olefin. The present invention describes a convenient process for making such olefin conversion.

According to the present invention an olefin for example 4-vinylcyclohexene is contacted with a catalyst made by mixing a rhodium complex, having the formula $(R_3M)_3RhX$ or $[(RO)_3M]_3RhX$ wherein R is an aromatic or saturated aliphatic hydrocarbon radical having up to about 20 carbon atoms per molecule including halo and hydrocarboxy derivatives thereof; M is phosphorus, arsenic or antimony; and X is halide, cyanide, or (R—COO—) radical; with a halide or organohalide of aluminum, boron or zinc, at conditions including temperature and time to allow the reaction product to be formed.

Some examples of $R_3M$ and $(RO)_3M$ ligands are triphenylphosphine, tributylphosphite, tribenzylarsine, tris(4-trifluoromethylphenyl)stibine, trimethylarsenite, trimethylphosphine, tricyclohexylphosphine, tri-n-octylarsenite, triisobutylstibine, triphenylarsine, and the like.

Some examples of suitable rhodium complexes which can be used as the first component of the catalyst system are tris(triphenylphosphine)chlororhodium,
tris(tributylphosphine)chlororhodium,
tris(triphenylarsine)iodorhodium,
tris(tribenzylstibine)chlororhodium,
tris(triethylphosphine)cyanorhodium,
tris(trimethylphosphine)bromorhodium,
tris(tributylstibine)fluororhodium,
tris(triphenylphosphine)acetorhodium, and the like and mixtures thereof.

Rhodium complexes can be prepared by known methods. Rhodium chloride reacts with an excess, for example 4 moles or more, of triphenylphosphine in refluxing ethanol to give dark red crystals of tris(triphenylphosphine)chlororhodium having a melting point of 138° C. Other rhodium complexes can be prepared by analogous methods.

The second component of the catalyst system is a halide of aluminum, boron, or zinc or an organohalide of these metals in which some, but not all, of the halogen atoms are replaced by radicals having the identity of R described in paragraphs above. Some examples of these metal halides which are suitable for use as second components for the catalyst systems are ethylaluminum dichloride,
aluminum tribromide,
aluminum trichloride,
silver fluoroborate,
zinc diiodide,
zinc dichloride,
diethylaluminum fluoride,
methylzinc bromide,
boron trichloride, and the like, and mixtures thereof.

The catalyst of the present invention is prepared simply by combining the first and second catalyst components for a sufficient time and under conditions which permit the catalytically active reaction product to be formed. In general, the catalyst components are combined at 20–130° C. for a time in the range of from a few seconds up to about several hours in the presence of a diluent in which both the components are at least partially soluble. Any convenient diluent such as chlorobenzene, methylene chloride, benzene, cyclohexane, pentane, and the like can be used for this purpose. The catalyst components are generally combined in equimolar proportions. However, other molar proportions can be used such as within the range of 3:1 to 1:3 but this is generally accompanied by inferior results. After the reaction product is formed, it need not be isolated but can be added directly to the reaction zone as a dispersion in its preparation solvent. If desired, the catalyst components can be separately added, in any order, to the reaction zone either in the presence or absence of the olefin to be converted.

The catalyst systems of the present invention are broadly applicable to the conversion of at least one of isomerizable feed olefinic compounds having up to about 20 carbon atoms per molecule. These olefinic compounds can be cyclic or acyclic, branched or unbranched, and can be either monoolefinic or can contain multiple double bonds.

A preferred class of olefinic compounds is represented by the formula

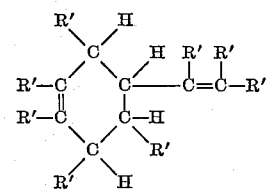

wherein each R' can be hydrogen or an alkyl radical having up to about 5 carbon atoms and wherein fewer than 5 such alkyl radicals are present in the molecule.

Some examples of the preferred class of olefinic feed compounds are:

4-vinylcyclohexene,
2-methyl-4-vinylcyclohexene,
3-n-pentyl-5-vinylcyclohexene,
1,2,3-trimethyl-4-vinylcyclohexene,
4-(1-hexenyl)cyclohexene,
1-methyl-4-(1-methylvinyl)cyclohexene, and the like.

Other examples of olefinic feed stocks are butene-1, 3,4-dimethylhexene-2, 1,6-hexadiene, 3-methylcyclopentene, 1,5-cyclooctadiene, 1,5,9-cyclododecatriene, 1-eicosene, and the like.

The conversion of 4-vinylcyclohexene to 3-ethylidenecyclohexene is a presently preferred embodiment of the invention. This conversion apparently goes through the intermediate formation of 4-ethylidenecyclohexene and, consequently, the reaction mixture can contain varying amounts of this 4-isomer depending upon whether the reaction is allowed to go to completion.

The olefinic conversion can take place at any convenient temperature within the range of 0–200° C., preferably 50–150° C., and at any convenient pressure. The time of contact will depend upon the reactivity of the specific olefins used and the activity of the specific catalyst systems employed as well as upon the desired degree of conversion. The reaction time will, however, generally be in the range of a few minutes to about 20 hours. The proportion of catalyst composition to feed olefin in the reaction will vary widely depending upon the rate of reaction desired but will generally be in the range of from about 0.001 to about 0.1 mole of rhodium complex per mole of olefin feed.

Any conventional contacting technique can be utilized for the olefin conversion process, and batchwise or continuous operation can be utilized. After the reaction period, the product can be separated and/or isolated by conventional means such as by fractionation, crystallization, adsorption, and the like. Unconverted feed materials can be recycled.

The invention can be further illustrated by the following examples.

EXAMPLE I

The compound, 4-vinylcyclohexene (4–VCH), was converted almost quantitatively to 3-ethylidenecyclohexene (3–ECH) using the reaction product of tris(triphenylphosphine)chlororhodium and ethylaluminum dichloride as a catalyst.

A 0.46 g. (0.5 mmole) quantity of tris(triphenylphosphine)chlororhodium was dissolved in 30 cc. chlorobenzene with stirring in a 7 oz. pressure bottle which had been flushed with nitrogen. A 5.0 cc. quantity of 4–VCH was added to the flask and stirred for ½ hour at room temperature with no apparent reaction. To this solution was then added 0.5 cc. of 1 M ethylaluminum dichloride (EtAlCl₂), and the bottle was placed in an 80° C. bath for 2 hours.

At the completion of the reaction period, the reaction mixture was analyzed by gas-liquid chromatography and found to contain (exclusive of the diluent) 3-ethylidene-cyclohexene as the sole product except for mere traces of lower boiling material.

In other similar tests, it was shown that the above reaction mixture could be charged with more than twice the above shown amount of 4–VCH and the catalyst system was still capable of near quantitative conversions to 3–ECH.

EXAMPLE II

The conversion of Example I was repeated except that 2 moles of EtAlCl₂ were used per mole of the rhodium complex.

A solution of 0.46 g. (0.5 mmole) of tris(triphenylphosphine)chlororhodium and 1.0 cc. of 1 M EtAlCl₂ in 30 cc. of chlorobenzene was contacted with 4.0 cc. 4–VCH for 1.5 hours at 80° C.

Analysis of the reaction mixture showed in wt. percent (exclusive of diluent):

| | |
|---|---|
| 4–VCH | 11 |
| 4–ECH | 9 |
| 3–ECH | 67 |
| Ethylbenzene | 1 |
| Ethylcyclohexene | 1 |
| Unknowns | 11 |

These data show that greater than equimolor proportions of the EtAlCl₂ to the rhodium complex are also operable though not preferred since conversions are reduced slightly.

EXAMPLE III

In a manner essentially identical to that of Example I, 4–VCH was converted to ethylidenecyclohexene with the same catalyst except that AgBF₄ was used instead of EtAlCl₂.

A 0.46 g. (0.5 mmole) quantity of the rhodium complex was mixed with 30 cc. chlorobenzene and 0.1 g. (0.5 mmole) of AgBF₄. To this was added 5.0 cc. of 4–VCH and the resulting mixture was heated for 1.5 hours at 80° C. with stirring.

The reaction mixture, on analysis, was found to contain (exclusive of diluent) in wt. percent:

| | |
|---|---|
| 4–VCH | 49 |
| 4–ECH | 2 |
| 3–ECH | 33 |
| Ethylbenzene | 6 |
| Ethylcyclohexene | 4 |
| Unknowns | 6 |

This test shows that the AgBF₄ is also effective in the rhodium complex-containing catalyst system.

EXAMPLE IV

In another test similar to that of Example I, 4–VCH was converted to 3–ECH over the catalyst resulting from the admixture of tris(triphenylphosphine)chlororhodium and AlCl₃.

A 100 ml. stirrer-equipped flask was charged with 0.13 g. AlCl₃, 0.93 g. the rhodium complex, and 30 cc. chlorobenzene. The mixture was maintained at 51–52° C. for 1 hour with stirring. To this dark red solution was added 10 cc. 4–VCH, and the heating of the flask and contents was continued for 2.25 hours. Analysis of the reaction mixture showed the following (exclusive of diluent )in wt. percent:

| | |
|---|---|
| 4–VCH | 6 |
| 4–ECH | 7 |
| 3–ECH | 87 |

The results above show that AlCl₃ is also effective in the catalyst system for this conversion.

In another identical test but at 128–9° C., the conversion of 4–VCH was complete after 20 minutes, and 93 wt. percent of the mixture was 3–ECH.

EXAMPLE V

In a test similar to the preceding tests, a catalyst system employing ZnCl₂ was used to convert 4–VCH.

A mixture of 0.30 g. tris(triphenylphosphine)chlororhodium, 0.05 g. dry ZnCl₂ and 25 cc. chlorobenzene was heated with stirring to 52° C. A 10 cc. quantity of 4–VCH was injected and the heating continued for 5 hours, reaching a maximum of 75° C.

Analysis of the reaction mixture showed the presence of 3–ECH as a product of the conversion.

EXAMPLE VI

In another similar test, 1,5-cyclooctadiene (1,5–COD) was isomerized employing tris(triphenylphosphine)chlororhodium and aluminum trichloride as the catalyst system.

A 1 g. quantity of tris(triphenylphosphine)chlororhodium was mixed with 0.2 g. AlCl₃ in 20 ml. chlorobenzene yielding a homogeneous dark red solution. A 2 ml. quantity of this solution and 6 ml. of 1,5–COD were heated at reflux for 4 hours. Gas-liquid chromatographic analysis of the reaction mixture showed the following, in weight percent, and on a solvent-free basis.

| | |
|---|---|
| 1,3–COD | 5 |
| 1,4–COD | 22 |
| 1,5–COD | 73 |

These results show that the present catalyst system is effective in isomerizing 1,5-cyclooctadiene.

That which is claimed is:

1. A process of preparing double bond isomers of at least one alkenylcycloalkene compound having up to 20 carbon atoms per molecule represented by the formula

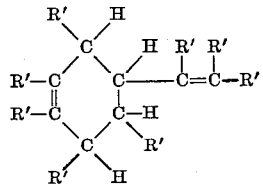

wherein each R' is hydrogen or an alkyl radical having up to about 5 carbon atoms and wherein fewer than 5 such alkyl radicals are present in the compound, which comprises contacting said alkenylcycloalkene compound with a catalyst system consisting essentially of (a) a complex rhodium salt having the formula $$(R_3M)_3RhX$$

wherein R is an aromatic hydrocarbon radical having up to 20 carbon atoms per molecule, M is phosphorus, arsenic or antimony, and X is a halide; and (b) a halide or organohalide selected from the group consisting of ethylaluminum dichloride, aluminum trichloride, silver fluoroborate, and zinc dichloride, under conditions which include a temperature range of 0–200° C., a contact time in the range of from a few minutes to about 20 hours, and at a ratio of the catalyst composition to the alkenylcycloalkene compound in the range of from about 0.001 to about 0.1 mole of rhodium complex per mole of the alkenylcycloalkene compound.

2. A process according to claim 1 wherein the (a) component of the catalyst is tris(triphenylphosphine)chlororhodium.

3. A process according to claim 2 wherein said alkenylcycloalkene compound is 4-vinylcyclohexene, and the reaction product comprises 3-ethylidenecyclohexene.

4. A process of preparing double bond isomers of at least one feed olefinic compound selected from the group consisting of butene-1, 3,4-dimethylhexene-2, 1,6-hexadiene, 3-methylcyclopentene, 1,5-cyclooctadiene, 1,5,9-cyclododecatriene, and 1-eicosene, which comprises contacting said feed olefinic compound with a catalyst system consisting essentially of (a) a complex rhodium salt having the formula $$(R_3M)_3RhX$$

wherein R is an aromatic hydrocarbon radical having up to 20 carbon atoms per molecule, M is phosphorus, arsenic or antimony, and X is a halide; and (b) a halide or organohalide selected from the group consisting of ethylaluminum dichloride, aluminum trichloride, silver fluoroborate, and zinc dichloride, under conditions which include a temperature range of 0–200° C., a contact time in the range of from a few minutes to about 20 hours, and at a ratio of the catalyst composition to the feed olefinic compound in the range of from about 0.001 to about 0.1 mole of rhodium complex per mole of the alkenylcycloalkene compound.

5. A process according to claim 4 wherein the (a) component of the catalyst is tris(triphenylphosphine)chlororhodium.

6. A process according to claim 5 wherein the (b) component of the catalyst system is ethylaluminum dichloride.

7. A process according to claim 6 wherein said feed olefin compound is 1,5-cyclooctadiene and the reaction product comprises 1,4-cyclooctadiene and 1,3-cyclooctadiene.

8. A catalyst system consisting essentially of (a) a complex rhodium salt having the formula $$(R_3M)_3RhX$$

wherein R is an aromatic hydrocarbon radical having up to 20 carbon atoms per molecule, M is phosphorus, arsenic, or antimony, and X is a halide; and (b) a halide or organohalide selected from the group consisting of ethylaluminum dichloride, aluminum trichloride, silver fluoroborate, and zinc dichloride.

9. A catalyst system according to claim 8 wherein (a) is tris(triphenylphosphine)chlororhodium.

References Cited

UNITED STATES PATENTS 3,328,378 6/1967 Piekarski et al. _____ 252—431
3,366,646 11/1968 Dewhirst.

OTHER REFERENCES

W. Hieber, Chem. Ber. 99 (8) 264–19, 1966.
J. Chatt et al., Chem and Ind. p. 931, 1960.

DELBERT E. GANTZ, Primary Examiner

V. O'KEEFE, Assistant Examiner

U.S. Cl. X.R.

252—431; 260—429, 680, 683.1